(12) United States Patent
Frank

(10) Patent No.: US 8,037,078 B2
(45) Date of Patent: Oct. 11, 2011

(54) CORPUS CLUSTERING, CONFIDENCE REFINEMENT, AND RANKING FOR GEOGRAPHIC TEXT SEARCH AND INFORMATION RETRIEVAL

(75) Inventor: John R. Frank, Cambridge, MA (US)

(73) Assignee: Nokia Corporation, Espoo (FI)

( * ) Notice: Subject to any disclaimer, the term of this patent is extended or adjusted under 35 U.S.C. 154(b) by 972 days.

(21) Appl. No.: 10/803,831

(22) Filed: Mar. 18, 2004

(65) Prior Publication Data

US 2004/0236730 A1    Nov. 25, 2004

Related U.S. Application Data

(60) Provisional application No. 60/455,627, filed on Mar. 18, 2003.

(51) Int. Cl.
*G06F 17/30* (2006.01)
(52) U.S. Cl. .......................... 707/748; 707/749
(58) Field of Classification Search .................. 707/3, 5, 707/748, 749
See application file for complete search history.

(56) References Cited

U.S. PATENT DOCUMENTS

| | | | |
|---|---|---|---|
| 6,240,425 B1 * | 5/2001 | Naughton | 707/104.1 |
| 6,377,949 B1 | 4/2002 | Gilmour | |
| 6,701,307 B2 * | 3/2004 | Himmelstein et al. | 707/3 |
| 2002/0026456 A1 | 2/2002 | Bradford | |
| 2002/0031269 A1 | 3/2002 | Fukushima | 382/228 |
| 2004/0024752 A1 * | 2/2004 | Manber et al. | 707/3 |

FOREIGN PATENT DOCUMENTS

| | | |
|---|---|---|
| JP | 2000-268033 | 9/2000 |
| JP | 2002-082943 | 3/2002 |

OTHER PUBLICATIONS

Wacholder et al., "Disambiguation of Proper Names in Text", Apr. 3, 1997, Proceedings of the 5th Applied Natural Language Processing Conference, pp. 202-208.*

(Continued)

*Primary Examiner* — Hung Q Pham
(74) *Attorney, Agent, or Firm* — Ditthavong Mori & Steiner, P.C.

(57) ABSTRACT

A computer-implemented method for processing a plurality of toponyms, the method involving: in a large corpus, identifying geo-textual correlations among readings of the toponyms within the plurality of toponyms; and for each toponym selected from the plurality of toponyms, using the identified geo-textual correlations to generate a value for a confidence that the selected toponym refers to a corresponding geographic location. Also a method of generating information useful for ranking a document that includes a plurality of toponyms for which there is a corresponding plurality of (toponym,place) pairs, there being associated with each (toponym,place) pair of said plurality of (toponym,place) pairs a corresponding value for a confidence that the toponym of that (toponym,place) pair refers to the place of that (toponym, place) pair. This further method includes, for a selected (toponym,place) pair of the plurality of (toponym,place) pairs, (1) determining if another toponym is present within the document that has an associated place that is geographically related to the place of the selected (toponym, place) pair; and (2) if a toponym is identified within the document that has an associated place that is geographically related to the place of the selected (toponym, place) pair, boosting the value of the confidence for the selected (toponym,place) pair.

24 Claims, 3 Drawing Sheets

OTHER PUBLICATIONS

Bagga et al., "Entity-based cross-document coreferencing using the Vector Space Model", 1998, Association for Computational Linguistics Morristown NJ USA, pp. 79-85.*

Shaw, W. M. Jr., "Term-Relevance Computations and Perfect Retrieval Performance", *Information Processing & Management*, vol. 31(4), pp. 491-498 (1995).

European Search Report for application No. 04757619.4-1225 PCT/US2004/008309, dated Jun. 6, 2007, 5 pages.

Rauch, E. et al., "A confidence-based framework for disambiguating geographic terms", Proceedings of the HLT-NAACI 2003 Workshop on Analysis of Geographic References, vol. 1, pp. 50-54, May 31, 2003, XP 002436419.

Smith, D. A. et al., "Disambiguating geographic names in a historical digital library", Research and Advanced Technology for Digital Libraries, European Conference ECDL Proceedings, pp. 127-136, 2001, XP 002272130.

Kanada, Yasusi, A Method of Geographical Name Extraction from Japanese Encyclopedia for Text Search in which the Results are Ordered by Geographical Areas:, IPSJ SIG Technical Reports, Japan IPSJ, Jul. 23, 1999, vol. 99, No. 62, pp. 9 to 16.

Japanese Search Report, International Application No. 2006-507322, (1 page).

Japanese Office action for corresponding JP patent app. No. 2006-507322 dated Jul. 15, 2010, pp. 1-10.

Japanese Office action for corresponding JP patent app. No. 2006-507322 dated Sep. 15, 2009, pp. 1-13.

European Office action for corresponding EP Patent App. No. 04 757 619.04-1225 dated Apr. 12, 2011, pp. 1-5.

* cited by examiner

CORPUS CLUSTERING, CONFIDENCE REFINEMENT, AND RANKING FOR GEOGRAPHIC TEXT SEARCH AND INFORMATION RETRIEVAL

This application claims the benefit of U.S. Provisional Application No. 60/455,627, filed Mar. 18, 2003.

TECHNICAL FIELD

This invention relates to spatial databases, document databases, information retrieval, information extraction, and search engines.

BACKGROUND OF THE INVENTION

There are many tools available for organizing and accessing documents matching specific criteria, such as containing certain keywords, key phrases, and their boolean combinations (Salton 1989). An important class of key phrases are named entities such as the names of people, organizations, places, dates. In addition to the presence of directly observable entities, there are indirect criteria that enhance document organization and access. For example, a document may describe an illegal act without using the words "illegal" or "unlawful" even once, it may allude to 'the largest Italian daily' without mentioning "Corriere della Sera", or it may describe an oil reservoir at latitude 61.3 N longitude 1.16 W without containing these coordinates, just by saying "a hundred miles north of Lerwick". Adding explicit markers to the text to distinguish entity names and to make explicit information that can be inferred about these, usually by means of a formal markup language such as SGML or XML, is commonly called named entity tagging. For a modem introduction to Information Retrieval and Information Extraction see R. Mitkov (ed): Handbook of Computational Linguistics, Oxford University Press 2003, chapters 29 and 30.

In particular, the use of directly mentioned or inferred geographic coordinates as a document selection criterion is well established (Woodruff and Plaunt 1994). In many cases, documents enrolled in the system either contain explicit geographic coordinates or such coordinates can be assigned to them manually, a labor-intensive process called manual tagging, whereby human readers inspect the documents, look up the coordinates of key places mentioned in the document in an atlas or database, and add tags by hand. From the perspective of Information Retrieval and Information Extraction, document without tags (also called raw or untagged documents) are considerably less valuable than tagged documents, and machine algorithms capable of automating the manual work are of great practical interest.

Many tools commonly used for organizing and accessing documents, in particular web search engines such as Google or Yahoo, also incorporate a step of relevance ranking, whereby documents deemed to be more relevant to the users' query are presented to the user earlier than the less relevant documents. Importantly, such a step can not rely entirely on manual pre-classification or ranking, since the same document will be relevant to some user queries and irrelevant to many others. The standard method for ranking, called "TF-IDF", is described e.g in S E Robertson and K Sparck Jones: Simple, proven approaches to text retrieval. University of Cambridge Computer Laboratory Technical Report 356, May 1997.

For further background, the reader is referred to the description of the Geographic Text Search (GTS) Engine found in U.S. patent application Ser. No. 09/791,533, filed Feb. 22, 2001, and entitled "Spatially Coding and Displaying Information," incorporated herein by reference.

SUMMARY OF THE INVENTION

In general, in one aspect the invention features a computer-implemented method for processing a plurality of toponyms, the method involving: in a large corpus, identifying geo-textual correlations among readings of the toponyms within the plurality of toponyms; and for each toponym selected from the plurality of toponyms, using the identified geo-textual correlations to generate a value for a confidence that the selected toponym refers to a corresponding geographic location.

Other embodiments include one or more of the following features. The computer-implemented method also includes using the confidences generated for the plurality of toponyms to rank documents according to their relevance to a search query. It further includes selecting a set of initial values for the confidences for the plurality of toponyms, and wherein using the identified geo-textual correlations to generate values for confidences involves modifying the set of initial values based on the identified geo-textual correlations within the corpus. The aspect of selecting the set of initial values for the confidences for the plurality of toponyms involves using a method of uniform priors. The aspect of identifying geo-textual correlations involves identifying within documents in the corpus toponyms that have associated geographic locations that are nearby to each other. The step of identifying geo-textual correlations involves identifying spatial correlation among geographic references of toponyms that are in textual proximity. The concept of textual proximity means within the same document or it means within the same document or any document closely linked with said same document. The computer-implemented method also includes processing the corpus by a named entity tagger prior to identifying the geo-textual correlations.

In general, I another aspect, the invention features a computer-implemented method of generating information useful for ranking a document that includes a plurality of toponyms for which there is a corresponding plurality of (toponym, place) pairs, there being associated with each (toponym, place) pair of the plurality of (toponym,place) pairs a corresponding value for a confidence that the toponym of that (toponym,place) pair refers to the place of that (toponym, place) pair. The method involves: for a selected (toponym, place) pair of the plurality of (toponym,place) pairs, (1) determining if another toponym is present within the document that has an associated place that is geographically related to the place of the selected (toponym, place) pair; and (2) if a toponym is identified within the document that has an associated place that is geographically related to the place of the selected (toponym, place) pair, boosting the value of the confidence for the selected (toponym,place) pair.

Other embodiments include one or more of the following features. The step of determining if another toponym is present within the document that has an associated place that is geographically related to the place of that (toponym, place) pair involves identifying another toponym that has an associated geographic region that encompasses the place of the selected (toponym, place) pair. The step of determining if another toponym is present within the document that has an associated place that is geographically related to the place of that (toponym, place) pair involves identifying another toponym that has an associated place that is geographically nearby the place of the selected (toponym, place) pair. The computer-implemented method also includes computing a geographical distance between the place associated with the identified toponym and the place of the selected (toponym, place) pair. The step of boosting involves calculating an adjustment value by computing an adjustment boosting function with the computed geographical distance as an input variable, the adjustment function being monotonically decreasing for increasing values of the input variable. The step of boosting involves deriving an initial boosting value from input including the calculated adjustment value. The step of boosting also involves applying a sigmoid function to the derived initial boosting value to compute a final boosting value and modifying the value of the confidence for the selected (toponym,place) pair by an amount determined by the final boosting value. The method further includes performing steps (1) and (2) for each (toponym,place) pair among the plurality of (toponym,place) pairs to generate modified values for the confidences for the plurality of (toponym,place) pairs; and using the modified values to rank documents according to their relevance to a search query.

In general, in still another aspect, the invention features a method of evaluating relevance of a plurality of documents to a search query that includes both text and geographic place terms. The method includes: for a selected document among the plurality of documents, (1) computing a textual term relevance score corresponding to the text terms in the query; (2) computing a geo-relevance score corresponding to the geographic terms in the query; and (3) combining the computed textual term relevance score and the computed geo-relevance score to derive an overall relevance score for that document, wherein computing the geo-relevance for the selected document involves identifying a plurality of (toponym,place) pairs that is associated with the selected document, and for each identified (toponym,place) pair, obtaining and using a value for a confidence that the toponym of the (toponym,place) pair refers to the place.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
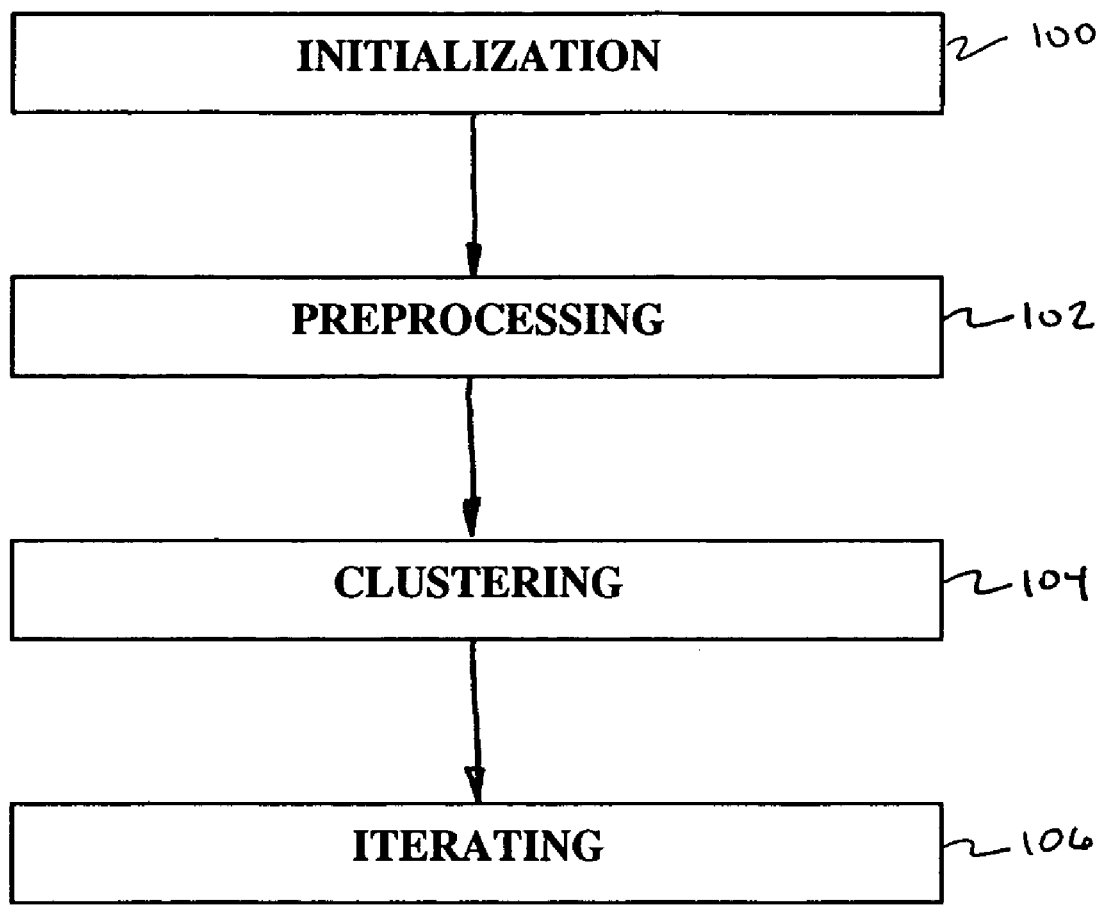
FIG. 1 is a flow diagram of the corpus clustering process.

The vast majority of documents does not contain explicit geographical coordinates (longitude and latitude), but contains such information implicitly, by toponyms and references relative to these. Toponyms are elements of natural language text referring to geographic locations on Earth. On occasion we find explicit geocoordinates such as "33.5N, 3.3W)\", more often we see full postal addresses "875 Massachusetts Avenue, Cambridge Mass.", but the most typical toponyms are words and phrases like "Paris", "London", and "Sault Ste. Marie" Syntactically toponyms come in many shapes and forms, the defining feature is that they have a "reading" that is a location with which they are associated. Toponyms designate latitude-longitude locations or areas. Thus, a reading of "Paris" is the geographical region associated with Paris, France. A reference relative to a toponym will either provide a refinement of the toponym "inner Paris", "South London", or signal a physical shift in coordinates "a hundred miles North of Venice". We will use the variables N,M to denote such elements of text.

Extensive lists of toponyms often contain millions of entries. Such lists, also called gazetteers, will associate places (physical locations defined by longitude/latitude coordinates) to the names. We will use the variables P, Q, R to denote places, reserving R to the special case of regions (places having large enough physical extent to contain other places). Many toponyms are also common words, for example, Elizabeth is typically a person's name but can also refer to a town in New Jersey, and Energy is a small town (pop 1175) in Williamson County, Ill. etc. In fact, the overlap between toponyms and ordinary words is so large that methods based on mechanical string lookup lead to an unacceptable rate of false positives. In the embodiments disclosed herein, this problem is resolved by assigning a numerical value, called the confidence to each toponym, refining this value depending on context, and using the result in ranking. The disclosed methods are used both for resolving ambiguity (e.g. whether in a document mentioning "London" the author intended London, England or London, Ontario) and for ranking documents according to there relevance.

We will use $c(N,P)$ to denote our confidence (degree of belief) that a particular piece of text N refers to a particular point P. The sum of $c(N,P)$ over all values P, denoted $c(N)$, is our overall confidence that N refers to some geographic entity. For example, c("London") is close to 1, reflecting the statistical fact that almost all occurrences of "London" are geographic, c("Washington") is medium, reflecting the statistical fact that many occurrences of "Washington" refer to the first president not to places named after him, and c("Energy") is low, reflecting the statistical fact that most occurrences of "Energy" are capitalized only because they appear as part of a company name or at the beginning of a sentence, and only a few will actually refer to the town of Energy in Illinois. A particularly important case is when the same name is used for different geographic entities: London is a big town P in England and a much smaller town Q in Ontario, and c("London", P) is very different from c("London", Q).

The method of uniform priors assigns the same initial numerical value to c(N) independent of N. By inspecting a large body of text, we may conclude that about 2% of the words are toponyms and assign the prior 0.02 to each word. In order to obtain better estimates, one needs to distinguish whether "Madison" is meant in a geographic sense, or perhaps James Madison, Madison Savings and Loan, or some other non-geographic entity is meant. To this end, one may feed a large number of documents through an existing system (e.g. the GTS described in U.S. Ser. No. 09/791,533, filed Feb. 22, 2001, and entitled "Spatially Coding and Displaying Information") and use the output of such a system to bootstrap the estimates. For example, if on a large body of text GTS estimates "Madison" to be a placename in 74% and a person's name in 26% of the cases, we could replace the original 0.02 value by 0.74. Importantly, bootstrapping remains a valid approach even if the system already relies on confidence values, and indeed developers routinely use the bootstrap technique to improve the performance of their own system.

We describe below statistical methods of initial confidence estimation (Section 1), confidence refinement (Section 2), and relevance ranking (Section 3) that exploit geographic context. By geographic context we mean the presence of other toponyms in the same document or in documents closely related by hyperlink structure. Also, it should be understood that these methods are not limited to the particular implementations that we present but rather are applicable to confidence estimation, confidence refinement, and relevance ranking, in general.

Section 1: Corpus Clustering

A large collection of documents is called a corpus. State of the art corpora often contain hundreds of thousands to billions of documents. When the documents contain just the words, we are talking about raw or untagged corpora. In tagged corpora, the words are enriched with side information such as part of speech and named entity markup. Here we disclose a class of statistical methods called here "corpus clustering" which assign initial confidence values $c(N,P)$ that represent our degree of belief that text element (name) N refers to point or region P.

A technical advance is achieved in the art by exploiting knowledge of a hitherto unobserved statistical property of documents, namely, geo-textual correlation. By inspecting large corpora, we have found that there is a high degree of spatial correlation in geographic references that are in textual proximity. This applies not only to points that are nearby (such as Madison and Milwaukee), but also to geographic entities that enclose or are enclosed by regions (Madison and Wisconsin, for example). More specifically, if the textual distance between names N and M is small, and if N has a reading P (i.e., N is associated with P or N means P) and M has a reading Q, then the physical distance between P and Q is likely to be lower than would be expected randomly. Conversely, if P and Q are close geographically, then their names N and M are more likely to appear together in texts than would be expected randomly. This correlation between geographic and textual distance is considered in estimating of the confidence $c(N,P)$ that a name N refers to a particular point P.

We disclose here a statistical method of exploiting the observed geo-textual correlation at the level of the corpus, even when the original corpus is untagged, and specifically extending to the case when the corpus is tagged automatically and/or is noisy (contains tagging errors). If a name N is often given a high probability of referring to a point P, then N is likely to refer to P even in the absence of other evidence in the document. Thus, each name-point pair (N,P) is given a confidence $c(N,P)$ which is the average probability of assigning P to instances of N in a large corpus. We divide the corpus clustering procedure in four phases (see FIG. 1).

1. Initialization (Phase 100 in FIG. 1). Estimation of initial confidence values $c_0(N,P)$ for each toponym N and location P. In one embodiment, all initial values are uniformly set to $c_0=0.02$ irrespective of the choice of N and P. In another embodiment, values for words N that appear in some list of toponyms are set to $c_0(N)=0.98$, values for words N' that do not appear on the list are set to $c_0(N')=0.02$.

2. Preprocessing (Phase 102 in FIG. 1). Processing the corpus by a named entity tagger. In one embodiment the named entity tagger is the GTS described U.S. patent application Ser. No. 09/791,533, filed Feb. 22, 2001, and entitled "Spatially Coding and Displaying Information," but the method does not depend on this particular choice. Other named entity taggers, such as GeoNODE (Vilain et al 2000), ThingFinder by InXight (http://www.inxight.com/products/oem/thing_finder/index.php) etc. could also be used in this stage for bootstrapping overall confidences $c(N)$. For bootstrapping confidences $c(N,P)$ one could use GTS or any tagger that assigns confidence values per point (neither GeoNODE nor ThingFinder does). Note that the tagger itself can rely on the current confidence values.

3. Clustering (Phase 104 in FIG. 1). For each name N, compute the number of occurrences $t(N)$ that were tagged in the preprocessing stage. If the total number of occurrences $n(N)$ is zero, the current estimates $c(N)$ and $c(N,P)$ are left unchanged. If $n(N)>0$, the current estimate $c_i(N)$ is replaced by $$c_{i+1}(N)=(1-w)*c_i(N)+w*t(N)/n(N).$$

The weight parameter w is kept constant: with $w=1$ the method is maximally used, with $w=0$ it is unused (all c values stay unchanged). A preferred value is $w=0.85$. This method establishes the overall confidence $c(N)$ that a name N is geographic. To obtain a confidence $c(N,P)$ that N refers specifically to P, we use $$c_{i+1}(N,P)=(1-w)*c_i(N,P)+w*T(N,P)$$

This is essentially the same formula as above, except that $t(N)/n(N)$, which counted the proportion of occurrences N was tagged, is now replaced by $T(N,P)$, which is a sigmoidal function of a likelihood ratio given as follows:

$$\sigma((A(N,P)/B(N,P))/(U(N,P)/V(N,P)))$$

Here $A(N,P)$ is the sum of confidences $C_i(M,Q)$ taken over all documents D in the corpus that contain both names N and M such that a point Q referred to by M is geographically close to P. (In the described embodiment, points P and Q within half degree of longitude and latitude are considered geographically close, and any region R containing P is considered geographically close.) $B(N,P)$ is the sum of confidences $C_i(M,Q)$ taken over all documents D in the corpus that contain both names N and M (point Q referred to by M need not be geographically close to P). $U(N,P)$ is the sum of confidences $C_i(M,Q)$ taken over all documents D in the corpus that contain M (irrespective of whether they mention N as well) such that a point Q referred to by M is geographically close to P. $V(N,P)$ is the sum of confidences $C_i(M,Q)$ taken over all documents D in the corpus that contain M.

4. Iteration (Phase 106 in FIG. 1). The initialization step needs to be performed once, but the preprocessing and clustering steps can be iterated any number of times. In each iteration step, the newly obtained $c_{i+1}(N)$ and $c_{i+1}(N,P)$ values replace the previous $c_i(N)$ and $c_i(N,P)$ values. In the described embodiment, this affects the preprocessing (phase 2, tagging the corpus with GTS) because GTS itself relies on confidence values. In other embodiments, the preprocessing remains unchanged (since other named entity taggers do not rely on confidence). In all embodiments, the clustering computation needs to be repeated in every iteration, since the $c_i(N)$ and $c_i(N,P)$ approximate the true value $c_{28}(N)$ and $c_{28}(N,P)$ successively better with growing i. Since in practice little improvement is observed after the first three iterations, in the described embodiment the number of iterations is set at three for $w=0.85$.

Section 2: Confidence Refinement.

The confidence values obtained by the corpus clustering method described in Section 1 are further refined for every occurrence of any name in a particular context by a series of rules divided here in four classes and discussed separately below (see FIG. 2).

2.1 Local Rules

As the first step (see phase 200 in FIG. 2), the confidence refinement based on the local context is done, where we take into account whether the word is lowercase ("Energy" has a larger chance of being a city name, than "energy"), whether it is an acronym, and whether it has a telltale prewords or postword (for example, if we consider word "Madison", the local contexts "city of Madison", "major of Madison", or "Madison community college" are strong positive indicators of the geographic nature of this name, while the local contexts "Mr. Madison", "Dr. Madison", or "Madison will arrive" are strong negative indicators that the name in question is geographic). Such rules are called "local" because they require the critical components of the rule, such as the target "Madison" and the pre-word "Mr." To appear in the same local text window.

This refinement is done via a series of rules of the form c # h, where c is the input confidence value, h is a boosting factor if between 0 and 1, a depressing factor if between −1 and 0. The composition # is defined as:

$$c \# h = c + h(1-c) \text{ if } h > 0$$

$$c \# h = c + hc \text{ if } h < 0 \text{ (the last summand is negative then)}$$

Another equivalent way to think about this formula is:

$$c \# h = abs(h)*\text{end} + (1 - abs(h))*c$$

where
  end=1 if h>0
  end=0 if h<0.

Note that the order matters: the # operation is not associative, and groups to the left.

In the described embodiment, a number of boosting/depressing operations are used: we describe "postword", "preword", "acronym depression", and "lowercase depression" here:

$$C_i(N,P,D) = C(N,P) \# W_L * H_L(N) \# W_A * H_A(N) \# W_{pre} * H_{pre}(N,D) \# W_{post} * H_{Post}(N,D)$$

where
  $H_L(N)$ is the lower-case penalty
  $H_A(N)$ is the acronym penalty
  $H_{Pre}(N,D)$ is the pre word heuristic
  $H_{Post}(N,D)$ is the post word heuristic This computation always starts with the same value C(N,P) (obtained by the corpus clustering method described in Section 1 above), and happens for all instances j of name N in document D. However, since different instances can appear in different contexts the outcomes $C_j(N,P,D)$ may differ, so to obtain the refined value the maximum of these, $C_m(N,P,D)$, is taken.

2.2. Non-Local Rules

Figure 2:
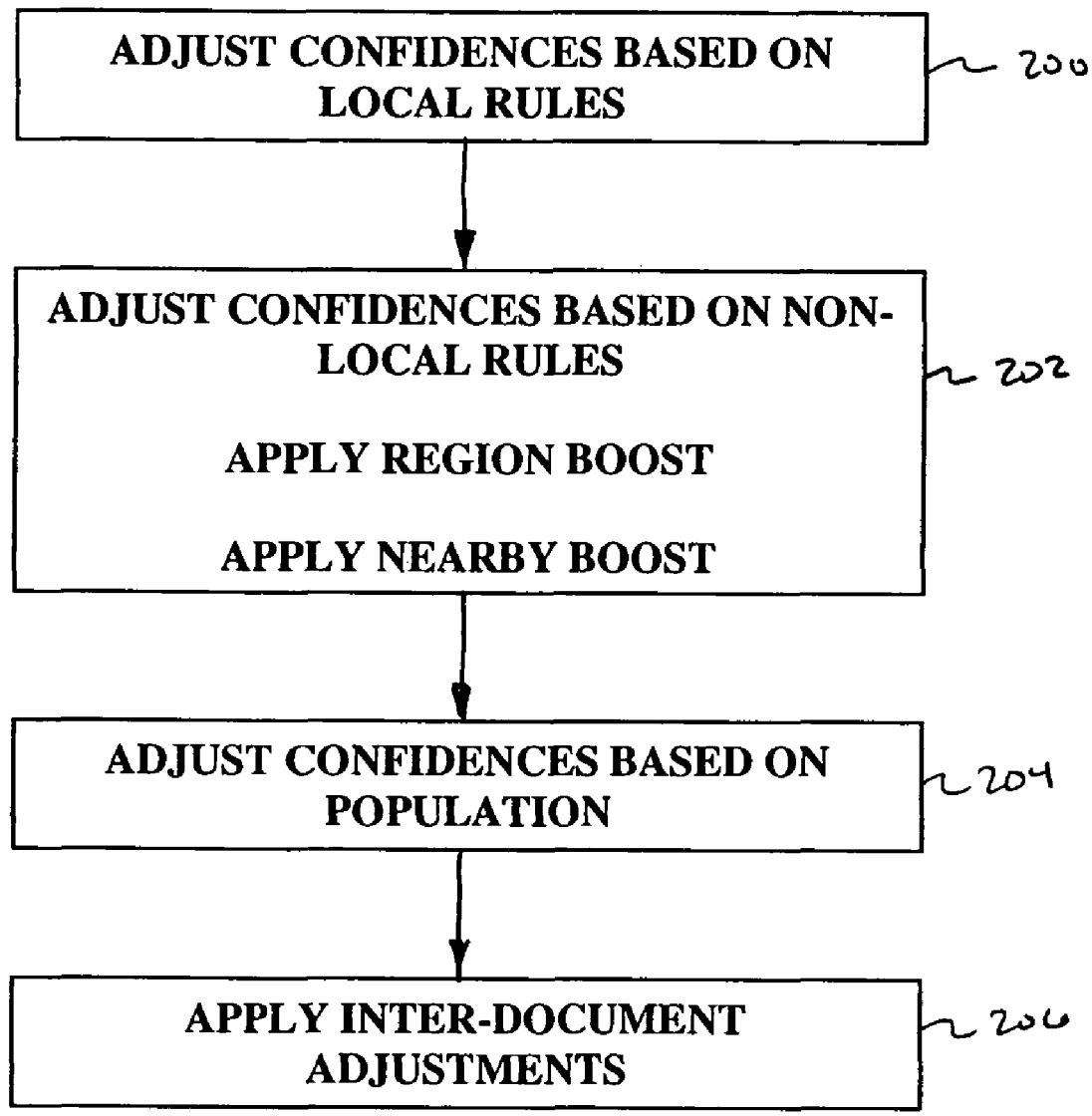
FIG. 2 is a flow diagram of the confidence refinement process.

Non-local rules are applied during phase 202 shown in FIG. 2. The non-local rules are designed to disambiguate between different geographic points P and Q which have the same name N. They are called "non-local" because they do not require the critical components of the rule to be adjacent to one another in the text. The confidences C(N,P) are being boosted if a region R enclosing P is mentioned or if geographically nearby candidate points Q are present, and these confidences are further adjusted based on their populations relative to the total populations of all points with a given name. One embodiment uses the TotalBoost function defined below, but the overall method does not depend on the choice of this particular sigmoidal function.

$$\text{TotalBoost}(S) = \left[ \frac{2}{1 + \exp\left(\frac{-8S}{M}\right)} - 1 \right]$$

where the preferred value of parameter M describing the level of saturation is 10.

2.2.1. Region Boost

Here, Strength(R) is the boosting strength of a given region R, inversely proportional to its area (e.g. continents give very little boost, counties give a lot). The regions enclosing a candidate point contribute to the confidence adjustment via the following method, which takes into account the character proximity between the name N and the name of the region R in the document D. First, we consider all regions R in the document that contain P geographically, and sum Strength(R)*CharProx(R,N), the latter factor being a decreasing function of the minimal textual distance (measured in characters) between mentions of R and N in D. This sum $S_R$ is then input to the TotalBoost sigmoidal function, to yield a boosting value:

$$h = W_D * \text{TotalBoost}(S)$$

which can apply by the # operation to the confidence $C_m$(P, N,D) prior to region boost to yield $C_R$(P,N,D).

Informally, the idea of region boost amounts to the notion that our confidence that a name N refers to a place P is boosted if the name of a region R that contains P is mentioned in the text. For example, if "Lamar County" is mentioned in the same document as "Paris", the chances of Paris, Tex. are considerably better than would be in the absence of such evidence.

2.2.2. Nearby Boost

This confidence refinement method increases the confidence of a name-point pair c(N,P) based on the number of points Q mentioned in the same document as N and their proximity. For each point Q mentioned in a document with P, we compute d(P,Q), the physical distance of P and Q, and take a function X of the square of the distance d(P,Q) which increases with decreasing distance but saturates, namely:

$$X = \left[ \frac{1.02}{1 + \exp\left(\frac{(d(P,Q))^2 - 0.5}{0.4}\right)} \right]^{0.1}$$

The overall boosting value h is then obtained by applying the TotalBoost function to Y, which is $S_R$ plus the sum of $C_R$(M,Q,D)*X*CharProx(N,M) taken over all names M in D. Finally, C(N,P,D) is set to $C_m$(N,P,D)#h.

Informally, the idea of nearby boost amounts to the notion that our confidence that a name N refers to a place P is boosted if the name of a nearby point Q is mentioned in the text. For example, if "Versailles" is mentioned in the same document as "Paris", the chances of Paris, France are considerably better than would be in the absence of such evidence.

2.3 Adjustment Based on Population

This adjustment discounts confidences of the name-point pairs (N,P) according to their population relative to the total population of all points with the given name N (see phase 204 in FIG. 2). If nearby points or enclosing regions for the given point P appear, we want this deflation to have less of an effect. Denote the population of the candidate point P as Pop(P), and the total population associated with the name N as Pop(N). Denote the suppressor factor as $$D\_pop = \max\_population\_depression * 2 / (1 + \exp(0.6 * Y)),$$

where Y was defined above as the sum of the region and the nearby point boost factors.

Informally, the idea of population adjustment amounts to the notion that our confidence that a name N refers to a place P is proportional to the size of P. For example, Paris, Tex. has about 25 thousand inhabitants, Paris France has about 2.5 million, so in the absence of other evidence the latter is about a hundred times more likely to be referred to.

2.4 Inter-Document Adjustment

Another confidence refinement method relies on inter-document context as available e.g. on the WorldWideWeb in the form of hyperlink structure (see phase 206 in FIG. 2). In contradistinction to Google's PageRank algorithm, we use link analysis to establish the geographic provenance of a document based on the geographic information contained in documents that link to it and documents linked from it. Instead of assigning a numerical rank expressing the value of a page, we assign it coordinates (longitude and latitude) based on the coordinates of the places the document talks about. This is an extension of our non-local methods, where the scope of the analysis involves not just a single document but also those hyperlinked to/from it, with exponentially decreasing weights for more indirectly linked pages.

Section 3. Ranking Based on Geographic Information

In Information Retrieval, it is rarely sufficient to find a (potentially very large) number of documents that are relevant to a user query. A practical system must also rank these documents on a scale of decreasing relevance, presenting users with the most relevant documents first. The addition of geographic dimensions to information retrieval means that in addition to the relevance of documents to a textual query (obtained using standard techniques), the relevance to the places mentioned in those documents must also be considered in order to rank the documents. The two kinds of relevance, traditional textual query relevance Q and georelevance G, must be properly balanced to return documents relevant to a user's query.

Georelevance is based on both the geographic confidence of the toponyms used in determining the coordinates of the locations discussed in the document, and the emphasis of the place name in the document. We have disclosed our methods for computing confidences in Section 1 and 2 above, here we disclose our methods of computing emphasis, with the focus on the differences between our toponym-specific methods and the standard information retrieval methods for computing term relevance (Refer to FIG. 3). Here a key realization is that a document does not have an unlimited amount of relevance to "spend" on places (a place mentioned in a document with many others is likely to be less relevant) and exploiting this fact for improved relevance ranking by decreasing the emphasis as a function ED(N) of the number of other geographic references in the document.

Each term w, be it a toponym or a non-geographic entity (such as a person's name), may occur in the text of the document multiple times, and the measures computed here take all different occurrences $w_j$ into account. In subsequent formulas, Occur(w) denotes the number of such occurrences raised to the three quarterth power, and NormDocLength is the total length of the document (measured in words) divided by 3000.

For toponyms, emphasis depends on the prominence of a given occurrence, and as we shall see below, it is computed somewhat differently from emphasis for non-geographic terms. If there is more than one reference to a point, emphasis is computed for each separately. Later one of these will be chosen.

Prominence Prom($w_j$) is a score which is a function of whether $w_j$ occurs in the title or header, whether it is bold or rendered in a large font. In the preferred embodiment Prom($w_j$)=0.1 for all toponyms, zero otherwise. A related notion of Emphasis Code applies to all terms in their non-geographic reading, and is defined as follows:

| | |
|---|---|
| in title | 1.00 |
| in header 1 | 0.75 |
| in header 2 | 0.50 |
| in a smaller header | 0.25 |
| in a big font | 0.175 |

| -continued | |
|---|---|
| in bold face or italic | 0.125 |
| unemphasized | 0 |

$w_j$ is considered to be "in a sentence" unless it is preceded by a tag within 22 positions of normalized text. If the position of $w_j$ is after 4500 characters of normalized text the penalty for being in sentence is InSentence($w_j$)=−0.05, otherwise the penalty is:

InSentence($w_j$)=−0.05*(position−1000)/3500.

If $w_j$ is not in sentence or its position is within 1000 characters from the beginning of the text, InSentence($w_j$)=0.

The position value Pos($w_j$) is similar, but the shape of the function is somewhat different. It is a piece-wise linear function of position p of $w_j$ (in characters for the text in normalized form), defined by the following points:

| Position(N) | Pos(N) |
|---|---|
| 0 | 1.00 |
| 0.6*1400 | 0.95 |
| 0.6*10000 | 0.40 |
| 0.6*50000 | 0.12 |
| larger | 0.12 |

Based on the foregoing, Emph($w_j$)=Pos($w_j$)+Prom($w_j$)+InSentence($w_j$). However, if the position of $w_j$ is within 250 characters of the end of the text and the resulting emphasis Emph($w_j$) is less than 0.8, we increase the resulting emphasis via reducing its distance to 0.8 by 40%:

Emph($w_j$)=Emph($w_j$)+(0.8−Emph($w_j$))*0.4

When there are multiple references $w_j$ to the same point in the document, the occurrence with the maximal emphasis value (the "main occurrence") is picked to represent this point.

For the toponyms explicitly listed in the gazetter (toponym list), the emphasis is boosted as a function of the number of occurrences:

Emph(w)=Emph(w)+num_occurrences_boost*(num_occurrences−1)/num_occurrences where in the described embodiment num_occurrences_boost=0.15.

The emphasis so obtained is modified by a function ED(N) of the weighted sum of other unique geographic references N in the document. Each is weighted by its confidence. This is based on the assumption that a document does not have an unlimited amount of relevance (or emphasis) to "spend" on places. Thus, a place mentioned in a document with many others is likely to be less relevant. For the purposes of this computation, street addresses "875 Massachusets Avenue, Cambridge Mass." or existing geocoordinates "33.15N, 22.7W" have a confidence of 1.0. Toponyms listed in the system gazetteer are counted as "the maximal initial gazetteer confidence" associated with the name, counted once per each name, regardless of the number of points associated with it or the number of its occurrences in the documents. Relative references "a hundred miles South of w" do not count towards n.

Moreover, only street addresses count for the purpose of depressing other street addresses. The mixture of true addresses and names described above counts for the purpose of depressing the points generated by names and relative references.

ED(n) is a piece-wise linear function of n defined by the following points:

| n      | ED(n) |
|--------|-------|
| 1      | 1.00  |
| 5      | 0.48  |
| 10     | 0.33  |
| 20     | 0.23  |
| 40     | 0.17  |
| 100    | 0.15  |
| larger | 0.15  |

The resulting emphasis is: Emph(w)=Emph(w)*(0.2+0.8*ED(n)).

To ensure that the final emphasis is between 0 and 1 in the described embodiment we perform a normalization step:

Emph(w)=Emph(w)/(max_prominence+num_occurrences_boost).

The emphasis of the name is now multiplied by its confidence to obtain the intermediate georelevance. Rel(w)=Emph(w)*Conf(w).

As for the relevance of non-geographical terms, we follow standard Information Retrieval methods. FirstPos(w) is the character position of the first occurrence of w in the normalized document. TermPos(w) is a piece-wise linear function of FirstPos(w) defined by the following points:

| FirstPos(w) | TermPos(w) |
|-------------|------------|
| 0           | 1.00       |
| 1400        | 0.95       |
| 10000       | 0.40       |
| 50000       | 0.12       |
| larger      | 0.12       |

The overall formula used in the described embodiment is:

$$Rel(w) = cfw * (1 + (k\_em * EmphCode(w))) *$$
$$((1 - k\_pos) + k\_pos * WordPos(w)) *$$
$$(k\_wo + 1) * Occur(w) /$$
$$(k\_wo * ((1 - k\_dl) + (k\_dl * NormDocLength)) + Occur(w))$$

where
   cfw=1.0 (Collection frequency weight can be used to dilute the effects of common words since they are not as important to users' queries.)
   $k_{cm}$=1.0 importance of emphasis code; a maximally emphasized word is 1+$k_{cm}$ times more relevant than baseline
   $k_{pos}$=0.7 importance of position heuristics; between 0 and 1
   $k_{wo}$=2.0 this is the INVERSE of the importance of word occurrences in word relevance; halve it to double the importance
   $k_{dl}$=0.05 importance of the document length; between 0 and 1
The relevances of all the query terms are then averaged to get term relevance, $R_w$.

Figure 3:
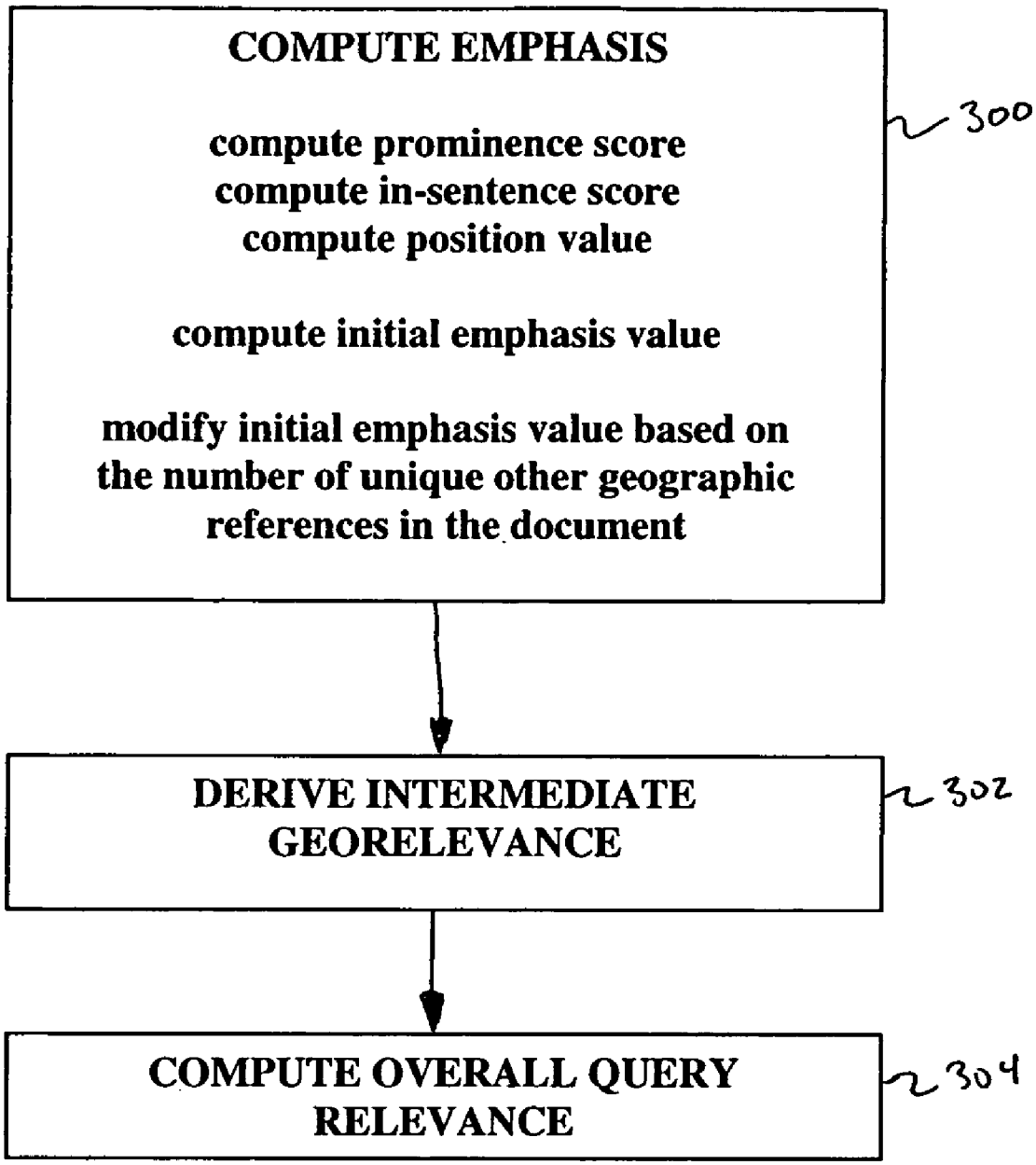
FIG. 3 is a flow diagram of the procedure for computing an overall relevance score for a document.

In ranking a document against a query, the system combines confidence, georelevance and term relevance (see block 304 in FIG. 3). Average term relevance $R_w$ and geo-relevance $R_g$ are balanced as follows. The more terms m in the user's query, the higher the weight $W_w$ we assign to the term component of the query; however we use a function that saturates at a maximum weight M. The term relevance weight is defined as:

$$W_w(m)=0.5+(M-0.5)*(m-1)/m$$

The final query relevance is:

$$(1-W_w(m))R_g(p)+W_w(m)R_w$$

There are many different ways in which standard Information Retrieval techniques can be extended to incorporate not only term relevance (typically computed based on Term Frequency and Inverse Document Frequency, "TF-IDF") and emphasis (typically computed based on formatting information and position in the text) but also terms specifically designed to capture georelevance and embodying the assumption that a high number of geographic terms in a document actually decreases the relevance of each. It is intended that such extensions are simply different embodiments of the techniques described herein and fall with the scope of the one or more of the claimed inventions.

The above-described methods or algorithms are typically performed on appropriately programmed computers. As is well known, such computers commonly have non-volatile storage, such as disk drives or CD-ROM, in which the program code and the data (e.g. values for confidences, documents, lists of toponyms, etc.) is stored and they also include some form of RAM into which the executable program code and variable values are loaded for execution. Such computers also include output devices such as visual display monitors and printers by which the results can be immediately presented to the user.

The initial confidences that are derived during the corpus clustering process would typically be pre-computed, usually on a different computer from the one on which the search queries will be run. Indeed, since the corpus clustering process is usually a very time-consuming, computationally intensive process, running that process on other computers ahead of time makes practical sense. This is also true of the confidence refinement phase of the process. So, it is usually only the ranking that is done after the user has supplied the query including both text and place references.

Other embodiments are within the following claims. For example, there are other systems embodying the specific formulas given above, and there are also other ways of embodying the same ideas but with formulas yielding numerically different results. It is intended that all such modifications and extensions fall with the scope of the following claims.

REFERENCES

Mitkov, R 2003: The Oxford Handbook of Computational Linguistics. Oxford University Press ISBN 0-19-823882-7

Salton, G 1989: Automatic Text Processing. Addison-Wesley Publishing Company ISBN 0-201-12227-8

Robertson, S E and Sparck Jones, K 1997: Simple, Proven Approaches to Text Retrieval, Technical Report TR356, Computer Laboratory, University of Cambridge Vilain M, Hyland R, and Holland R 2000: Exploiting Semantic Extraction for Spatiotemporal Indexing in GeoNODE. In: Proceedings of RIAO-2000. Paris, April 2000, ISBN 2-905450-07-X Woodruff, A G and Plaunt C 1994: GIPSY: Automated Geographic Indexing of Text Documents. Journal of the American Society of Information Science Vol 45 pp 645-655

What is claimed is:

1. A method comprising:
   selecting, by a processor, a toponym-place pair of a target document that includes a plurality of toponyms corresponding to a plurality of toponym-place pairs, wherein the place of each toponym-place pair identifies a geographical location or region designated by the corresponding toponym; and
   for the selected toponym-place pair, the method further comprises:
   generating, by the processor, a confidence value, wherein the confidence value presents a confidence that the toponym of the selected toponym-place pair refers to the place of the selected toponym-place pair, and wherein the confidence value is pre-computed and derived from a statistical observation about a plurality of documents;
   determining if another toponym is present within the target document that has an associated place that is geographically related to the place referred to by the selected toponym-place pair; and
   if the another toponym is present within the target document that has an associated place that is geographically related to the place referred to by the selected toponym-place pair, boosting the generated confidence value for the selected toponym-place pair for the target document; and
   ranking the target document based on the boosted confidence value.

2. The method of claim 1, wherein determining if the another toponym is present within the target document that has an associated place that is geographically related to the place referred to by the selected toponym-place pair involves identifying the another toponym based, at least in part, on the another toponym having an associated geographic region that encompasses the place referred to by the selected toponym-place pair.

3. The method of claim 1, wherein determining if the another toponym is present within the target document that has an associated place that is geographically related to the place referred to by the selected toponym-place pair includes identifying the another toponym based, at least in part, on the another toponym having an associated place that is geographically nearby the place referred to by the selected toponym-place pair.

4. The method of claim 3, further comprising:
   computing a geographical distance between the place associated with the identified another toponym and the place referred to by the selected toponym-place pair.

5. The method of claim 4, wherein boosting involves calculating an adjustment value by computing an adjustment boosting function with the computed geographical distance as an input variable, said adjustment boosting function being monotonically decreasing for increasing values of the input variable.

6. The method of claim 5, wherein boosting further involves deriving an initial boosting value from input including the calculated adjustment value.

7. The method of claim 6, wherein boosting further involves applying a sigmoid function to the derived initial boosting value to compute a final boosting value and modifying the value of the confidence for the selected toponym-place pair by an amount determined by the final boosting value.

8. The method of claim 1, wherein the associated place is different from the place referred to by the selected toponym-place pair.

9. An apparatus comprising:
   at least one processor; and
   at least one memory including computer program code for one or more programs, the at least one memory and the computer program code configured to, with the at least one processor, cause the apparatus to perform at least the following,
   select a toponym-place pair of a target document that includes a plurality of toponyms corresponding to a plurality of toponym-place pairs, wherein the place of each toponym-place pair identifies a geographical location or region designated by the corresponding toponym; and
   for the selected toponym-place pair, the apparatus is further caused to:
   generate a confidence value, wherein the confidence value presents a confidence that the toponym of the selected toponym-place pair refers to the place of the selected toponym-place pair, and wherein the confidence value is pre-computed and derived from a statistical observation about a plurality of documents;
   determine if another toponym is present within the target document that has an associated place that is geographically related to the place referred to by the selected toponym-place pair; and
   if the another toponym is present within the target document that has an associated place that is geographically related to the place referred to by the selected toponym-place pair, boosting the generated confidence value for the selected toponym-place pair for the target document; and
   ranking the target document based on the boosted confidence value.

10. The apparatus of claim 9, wherein determining if the another toponym is present within the target document that has an associated place that is geographically related to the place referred to by the selected toponym-place pair involves identifying the another toponym based, at least in part, on the another toponym having an associated geographic region that encompasses the place referred to by the selected toponym-place pair.

11. The apparatus of claim 9, wherein determining if the another toponym is present within the target document that has an associated place that is geographically related to the place referred to by the selected toponym-place pair includes identifying the another toponym based, at least in part, on the another toponym having an associated place that is geographically nearby the place referred to by the selected toponym-place pair.

12. The apparatus of claim 11, wherein the apparatus is further caused to:
   compute a geographical distance between the place associated with the identified another toponym and the place referred to by the selected toponym-place pair.

13. The apparatus of claim 12, wherein boosting involves calculating an adjustment value by computing an adjustment boosting function with the computed geographical distance as an input variable, said adjustment boosting function being monotonically decreasing for increasing values of the input variable.

14. The apparatus of claim 13, wherein boosting further involves deriving an initial boosting value from input including the calculated adjustment value.

15. The apparatus of claim 14, wherein boosting further involves applying a sigmoid function to the derived initial boosting value to compute a final boosting value and modifying the value of the confidence for the selected toponym-place pair by an amount determined by the final boosting value.

16. The apparatus of claim 9, wherein the associated place is different from the place referred to by the selected toponym-place pair.

17. A non-transitory computer-readable storage medium carrying one or more sequences of one or more instructions for execution by one or more processors, wherein the executed one or more sequences of one or more instructions cause an apparatus to at least perform the following steps:
   selecting a toponym-place pair of a target document that includes a plurality of toponyms corresponding to a plurality of toponym-place pairs, wherein the place of each toponym-place pair identifies a geographical location or region designated by the corresponding toponym; and
   for the selected toponym-place pair the apparatus is caused to further perform:
   generating a confidence value, wherein the confidence value presents a confidence that the toponym of the selected toponym-place pair refers to the place of the selected toponym-place pair, and wherein the confidence value is pre-computed and derived from a statistical observation about a plurality of documents;
   determining if another toponym is present within the target document that has an associated place that is geographically related to the place referred to by the selected toponym-place pair; and
   if the another toponym is present within the target document that has an associated place that is geographically related to the place referred to by the selected toponym-place pair, boosting the generated confidence value for the selected toponym-place pair for the target document; and
   ranking the target document based on the boosted confidence value.

18. The non-transitory computer-readable storage medium of claim 17, wherein determining if the another toponym is present within the target document that has an associated place that is geographically related to the place referred to by the selected toponym-place pair involves identifying the another toponym based, at least in part, on the another toponym having an associated geographic region that encompasses the place referred to by the selected toponym-place pair.

19. The non-transitory computer-readable storage medium of claim 17, wherein determining if the another toponym is present within the target document that has an associated place that is geographically related to the place referred to by the selected toponym-place pair includes identifying the another toponym based, at least in part, on the another toponym having an associated place that is geographically nearby the place referred to by the selected toponym-place pair.

20. The non-transitory computer-readable storage medium of claim 19, wherein the apparatus is caused to further perform:
   computing a geographical distance between the place associated with the identified another toponym and the place referred to by the selected toponym-place pair.

21. The non-transitory computer-readable storage medium of claim 20, wherein boosting involves calculating an adjustment value by computing an adjustment boosting function with the computed geographical distance as an input variable, said adjustment boosting function being monotonically decreasing for increasing values of the input variable.

22. The non-transitory computer-readable storage medium of claim 21, wherein boosting further involves deriving an initial boosting value from input including the calculated adjustment value.

23. The non-transitory computer-readable storage medium of claim 22, wherein boosting further involves applying a sigmoid function to the derived initial boosting value to compute a final boosting value and modifying the value of the confidence for the selected toponym-place pair by an amount determined by the final boosting value.

24. The non-transitory computer-readable storage medium of claim 17, wherein the associated place is different from the place referred to by the selected toponym-place pair.

* * * * *